(12) United States Patent
Kang et al.

(10) Patent No.: US 7,718,296 B2
(45) Date of Patent: May 18, 2010

(54) LIQUID FUEL CARTRIDGE HAVING BISTABLE STRUCTURE

(75) Inventors: Sang-kyun Kang, Seongnam-si (KR); Do-young Seung, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1038 days.

(21) Appl. No.: 11/409,029

(22) Filed: Apr. 24, 2006

(65) Prior Publication Data

US 2006/0237460 A1    Oct. 26, 2006

(30) Foreign Application Priority Data

Apr. 26, 2005    (KR) .................. 10-2005-0034498

(51) Int. Cl.
- H01M 2/00 (2006.01)
- B65D 35/22 (2006.01)
- B65D 35/28 (2006.01)

(52) U.S. Cl. ................ 429/34; 222/94; 222/95; 429/38

(58) Field of Classification Search .............. 429/25, 429/34, 35; 222/94, 95
See application file for complete search history.

(56) References Cited

U.S. PATENT DOCUMENTS

| | | | |
|---|---|---|---|
| 4,688,028 A * | 8/1987 | Conn | 340/625 |
| 2003/0037487 A1 * | 2/2003 | Amendola et al. | 48/76 |
| 2003/0082427 A1 | 5/2003 | Prasad et al. | |
| 2003/0129464 A1 * | 7/2003 | Becerra et al. | 429/25 |
| 2005/0023236 A1 * | 2/2005 | Adams et al. | 215/3 |
| 2005/0130009 A1 * | 6/2005 | Hasegawa et al. | 429/34 |

FOREIGN PATENT DOCUMENTS

| | | |
|---|---|---|
| JP | 60-222697 | 11/1985 |
| JP | 4-223058 | 8/1992 |
| JP | 6-015836 | 1/1994 |
| JP | 2003-92128 | 3/2003 |
| WO | WO 03/061047 | 7/2003 |

OTHER PUBLICATIONS

Office Action issued in corresponding Chinese Patent Application No. 2006100681338 dated Sep. 28, 2007.
Certificate of Patent issued in corresponding Chinese Patent No. 200610068133.8 dated Oct. 1, 2008.

* cited by examiner

*Primary Examiner*—Dah-Wei D Yuan
*Assistant Examiner*—Edu E Enin-Okut
(74) *Attorney, Agent, or Firm*—Stein McEwen, LLP

(57) ABSTRACT

A liquid fuel cartridge having a bistable structure includes a housing, a storage unit that is placed in the housing and stores a liquid fuel, a fuel outlet that is connected to an end of the storage unit and extends to an outside of the housing, a bistable structure that is connected to the storage unit and shows bistable states of a full state and an exhausted state thereof, and a window through which the bistable states of the bistable structure is detected.

15 Claims, 6 Drawing Sheets

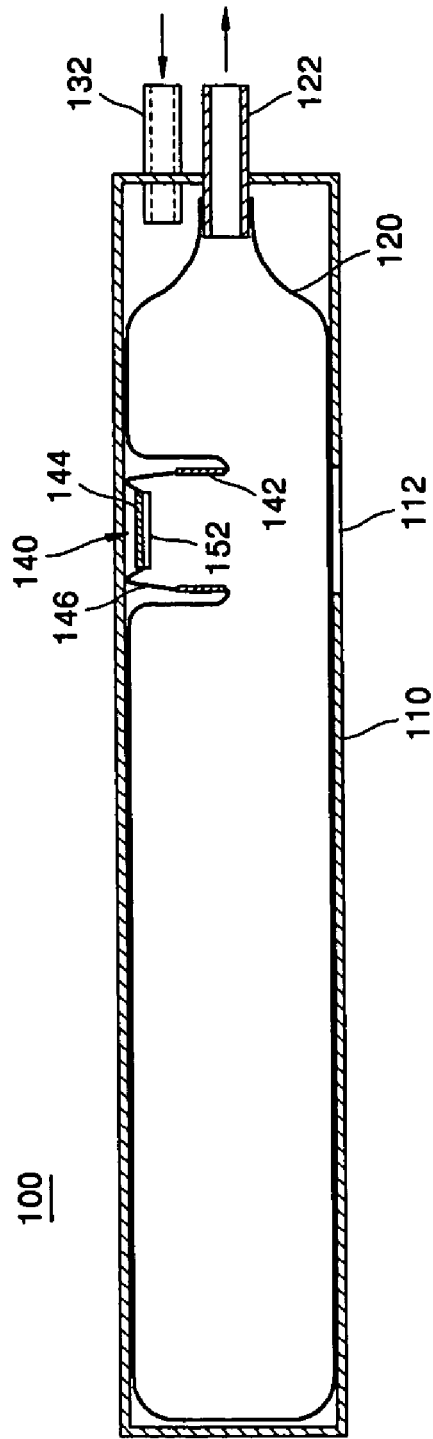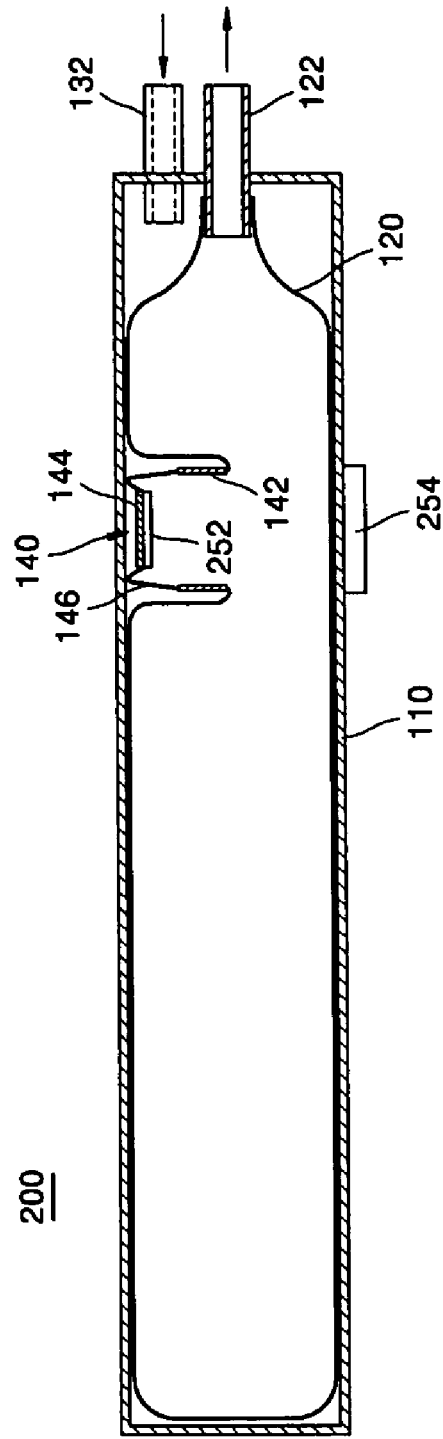

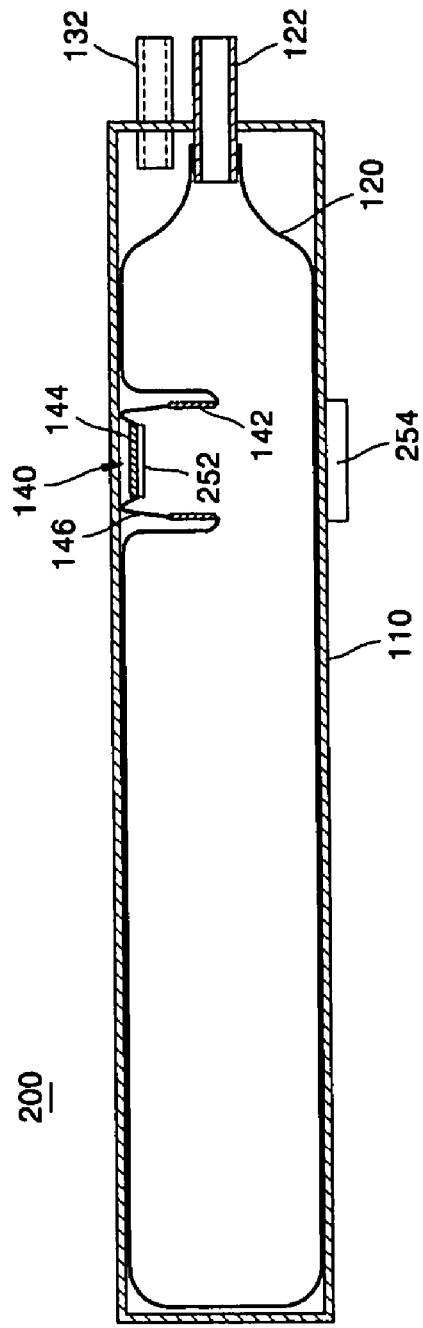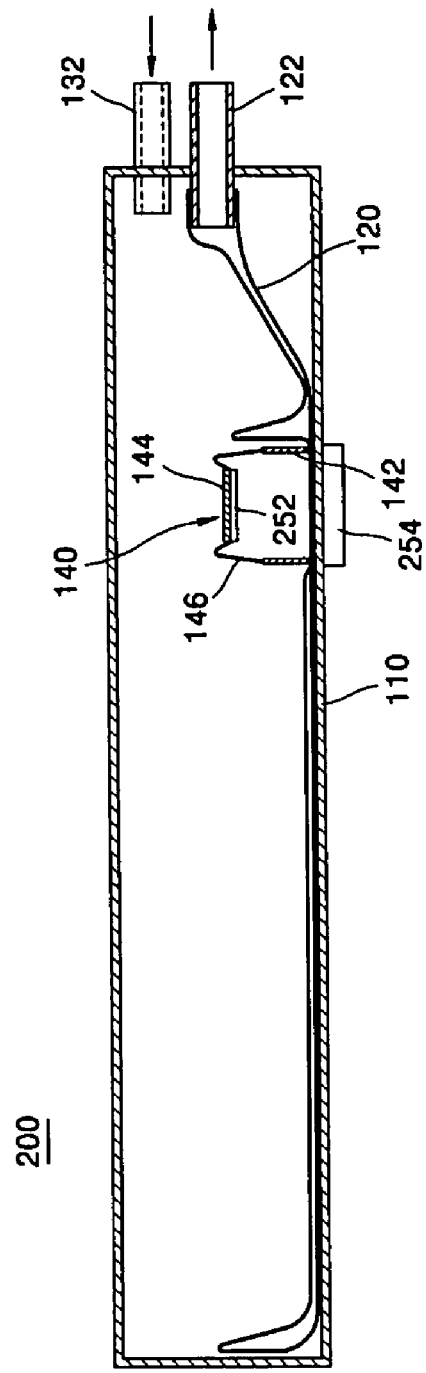

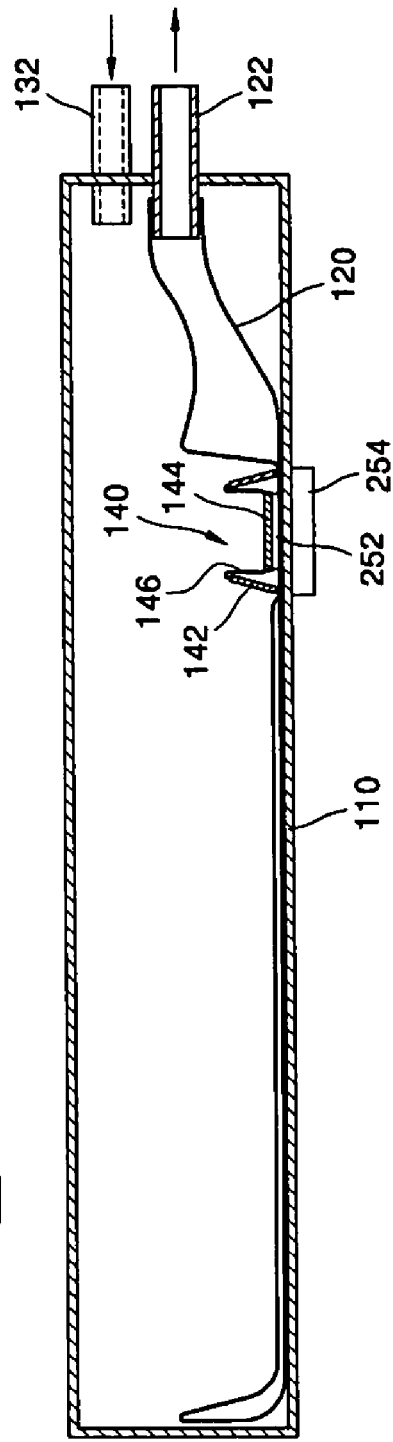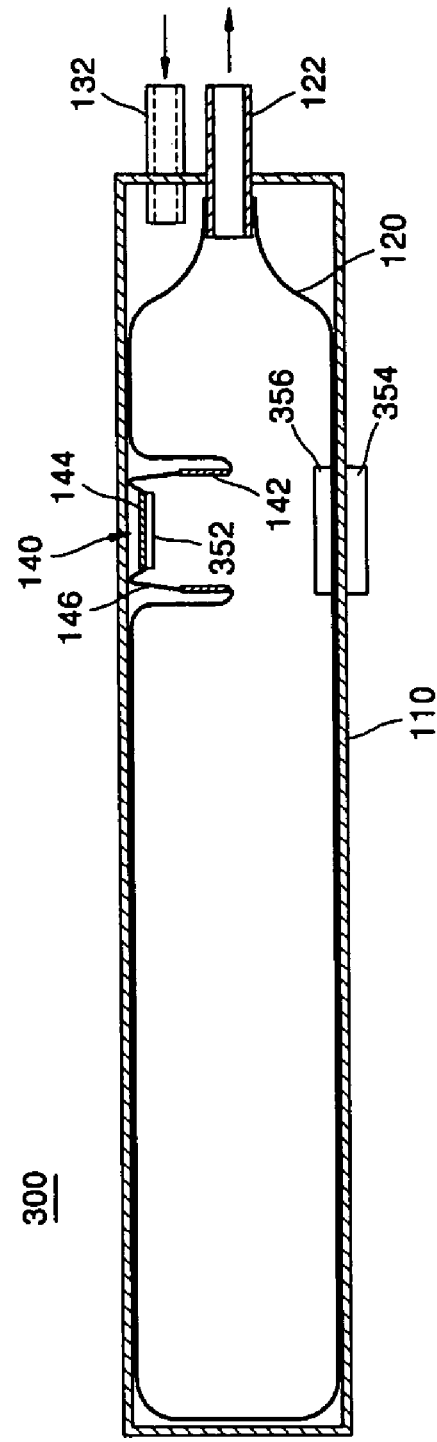

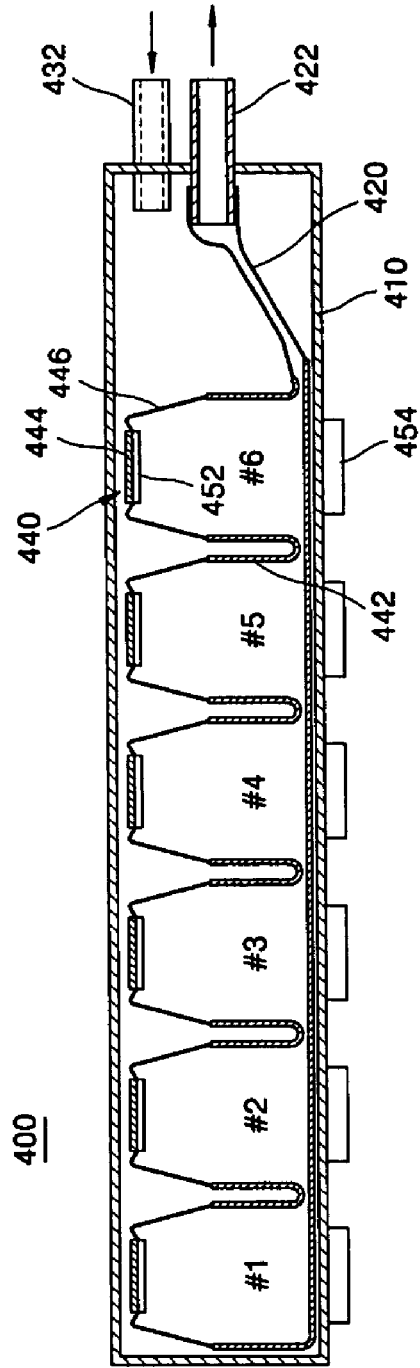
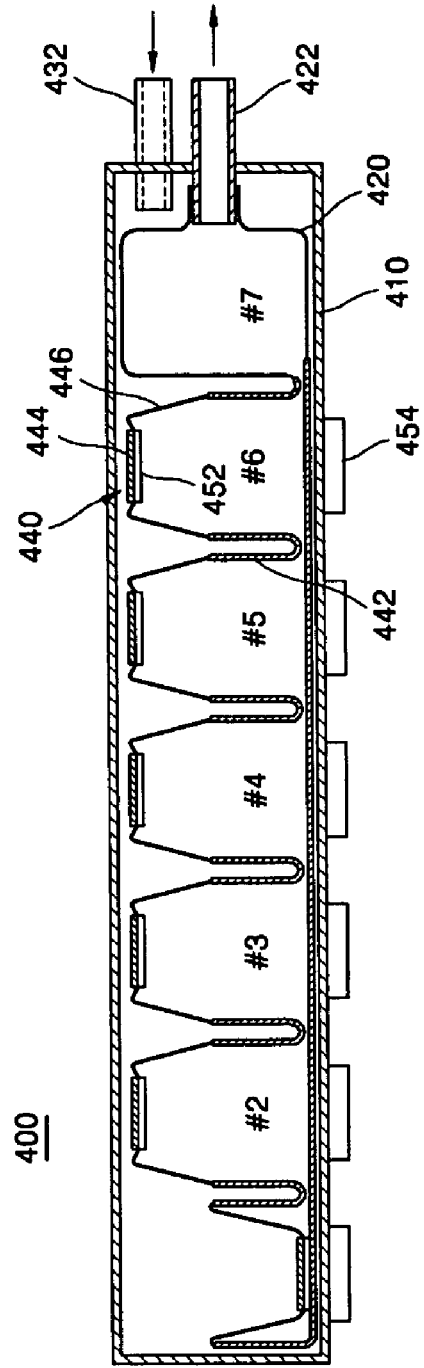

LIQUID FUEL CARTRIDGE HAVING BISTABLE STRUCTURE

CROSS-REFERENCE TO RELATED APPLICATIONS

This application claims the benefit of Korean Patent Application No. 2005-34498, filed on Apr. 26, 2005, in the Korean Intellectual Property Office, the disclosure of which is incorporated herein by reference.

BACKGROUND OF THE INVENTION

1. Field of the Invention

Aspects of the present invention relate to a liquid fuel cartridge, and more particularly, to a liquid fuel cartridge having a bistable structure that allows for the amount of liquid fuel remaining in the cartridge to be determined.

2. Description of the Related Art

A direct liquid feed fuel cell is an apparatus that generates electricity via electrochemical reactions between a liquid organic fuel, such as methanol or ethanol, and an oxidant, i.e., oxygen. The electricity generated by the direct liquid feed fuel cell has high specific energy density and high current density. Also, since a liquid fuel, i.e., methanol, is directly fed to the cell, the direct feed fuel cell does not require a peripheral device such as a fuel reformer, and storing and supplying the liquid fuel are easy.

As depicted in FIG. 1, the direct feed fuel cell has a structure including an anode electrode 2, a cathode electrode 3, and an electrolyte membrane 1 interposed between the two electrodes 2 and 3. The anode electrode 2 includes a diffusion layer 22 for supplying and diffusing a fuel, a catalyst layer 21 at which oxidation and reduction reactions of the fuel occur, and an electrode supporting layer 23. The cathode electrode 3 also includes a diffusion layer 32 for supplying and diffusing the fuel, a catalyst layer 31 on which oxidation and reduction reactions of the fuel occur, and an electrode supporting layer 33. The catalyst for generating the electrode reaction is formed of a precious metal, such as platinum, having a superior catalytic characteristic at low temperature. Alternately, to avoid catalyst poisoning by CO, which is a by-product from the electrode reaction, a transition metal alloy catalyst, comprising ruthenium, rhodium, osmium, or nickel can be used. The electrode supporting layers 23 and 33 can be made of a water-proofed carbon paper or water-proofed carbon fiber for easy supplying of fuel and discharging reaction products. The electrolyte membrane 1 is a hydrogen ion exchange membrane having ion conductivity and containing moisture, and is formed of a polymer membrane having a thickness of 50~200 μm.

An electrode reaction of a direct methanol fuel cell (DMFC), which is a direct liquid feed fuel cell, includes an anode reaction where fuel is oxidized and a cathode reaction where hydrogen and oxygen are reduced, as described below.

$$CH_3OH + H_2O \rightarrow CO_2 + 6H^+ + 6e^- \text{ (Anode reaction)} \quad [\text{Reaction 1}]$$

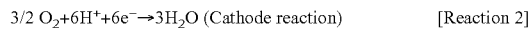
$$3/2\, O_2 + 6H^+ + 6e^- \rightarrow 3H_2O \text{ (Cathode reaction)} \quad [\text{Reaction 2}]$$

$$CH_3OH + 3/2\, O_2 \rightarrow 2H_2O + CO_2 \text{ (Overall reaction)} \quad [\text{Reaction 3}]$$

Carbon dioxide, hydrogen ions, and electrons are produced at the anode electrode 2 where the fuel is oxidized (reaction 1). The produced hydrogen ions migrate to the cathode electrode 3 through a hydrogen ion exchange membrane 1. Water is produced by the reduction reaction between hydrogen ions, electrons transferred from an external circuit, and oxygen at the cathode electrode 3 (reaction 2). Accordingly, water and carbon dioxide are produced as the result of an overall electrochemical reaction (reaction 3) between methanol and oxygen, and two moles of water are produced for each mole of methanol that reacts with oxygen.

Fuels used in a fuel cell may be stored in a separated fuel tank or in a replaceable cartridge. When a conventional cartridge is used, in order to know the amount of fuel remaining in the cartridge, the flowrate of the fuel pump in use and the amount of fuel stored in the cartridge must be known. However, the flowrate of the pump varies according to the pressure change in the cartridge and the amount of fuel remaining in the cartridge. Accordingly, a device that reliably indicates the amount of fuel remaining in a liquid fuel cartridge is needed.

SUMMARY OF THE INVENTION

Aspects of the present invention provide a liquid fuel cartridge having a device that indicates the amount of fuel remaining in the cartridge.

Additional aspects and/or advantages of the invention will be set forth in part in the description which follows and, in part, will be obvious from the description, or may be learned by practice of the invention.

According to an aspect of the present invention, there is provided a liquid fuel cartridge, comprising: a housing; a storage unit that is placed in the housing and stores a liquid fuel and comprises a bistable structure that has bistable states corresponding to a full state and an exhausted state, respectively, of the storage unit; a fuel outlet that is connected to an end of the storage unit and extended to an outside of the housing; and a window through which the bistable state of the bistable structure is detected.

The bistable structure may comprise: a pair of wall portions facing each other; a roof portion that indicates the bistable states of the bistable structure; and a flexible portion that connects the wall portions and the roof portion, wherein the roof portion is located at a higher or raised position when the bistable structure contains liquid fuel and is located at a lowered position when the liquid fuel in the bistable structure is exhausted.

The liquid fuel cartridge may further comprise a marker on the roof portion that is visible through the window.

The liquid fuel cartridge may further comprise: a water recovering unit in the housing to store water recovered from a fuel cell; and a water inlet extended to an outside of the housing to allow water to enter into the water recovering unit from the fuel cell.

According to another aspect of the present invention, there is provided a liquid fuel cartridge, comprising: a housing; a storage unit that is placed in the housing and stores a liquid fuel and comprising a bistable structure that has bistable states having a full state and an exhausted state therein; a fuel outlet that is connected to an end of the storage unit and extended to an outside of the housing; and a sensor unit that detects the bistable states of the bistable structure.

The bistable structure may comprise: a pair of wall portions facing each other; a roof portion that indicates the bistable states of the bistable structure; and a flexible portion that connects the wall portions and the roof portion, wherein the roof portion is located at a higher or raised position when the bistable structure contains liquid fuel and is located at a lowered position when the liquid fuel in the bistable structure is exhausted.

The sensor unit may comprise: a magnetic sensor installed at a location of the housing corresponding to the bistable structure; and a magnet installed at the roof portion.

The sensor unit may comprise: a Hall effect sensor; a first magnet installed at the roof portion; and a second magnet installed at the housing at a location corresponding to the location of the bistable structure, wherein first magnet contacts the second magnet when the the Hall effect sensor detects a combination of the first magnet and the second magnet.

According to still another aspect of the present invention, there is provided a liquid fuel cartridge comprising: a housing; a storage unit that is placed in the housing and stores a liquid fuel and comprises a plurality of bistable structures that are connected in a row in the storage unit and show bistable states having a full state and an exhausted state therein; a fuel outlet that is connected to an end of the storage unit and extended to an outside of the housing; and a window through which the bistable states of the bistable structure is detected.

According to yet another aspect of the present invention, there is provided a liquid fuel cartridge comprising: a housing; a storage unit that stores a liquid fuel in the housing and comprises a plurality of bistable structures that are connected in a row in the storage unit and show bistable states having a full state and an exhausted state therein; a fuel outlet that is connected to an end of the storage unit and extended to an outside of the housing; and a sensor unit that detects the bistable states of each of the bistable structures.

According to yet another aspect of the present invention, there is provided a direct liquid feed fuel cell system comprising: a direct liquid feed fuel cell that generates electricity, that consumes a liquid fuel and that produces water as a by-product; and a liquid fuel cartridge comprising a housing; a storage unit that is placed in the housing and that stores a liquid fuel, wherein the storage unit comprises one or more bistable structures, wherein each bistable structure has bistable states corresponding to a full state and an exhausted state with respect to an amount of liquid fuel contained therein a fuel outlet that is connected to an end of the storage unit and that provides liquid fuel from the storage unit to the direct liquid feed fuel cell; a water recovering unit in the housing to store water recovered from the direct liquid feed fuel cell; a water inlet extending to an outside of the housing to allow water to enter into the water recovering unit from the direct liquid feed fuel cell; and one or more windows or one or more sensors through which the bistable state of each bistable structures is detected.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a cross-sectional view illustrating a liquid fuel cartridge according to an embodiment of the present invention;

FIG. 3 is a cross-sectional view illustrating a liquid fuel cartridge according to another embodiment of the present invention;

FIGS. 4A through 4C are cross-sectional views for explaining the operation of the liquid fuel cartridge of FIG. 3;

FIG. 5 is a cross-sectional view illustrating a liquid fuel cartridge according to still another embodiment of the present invention;

FIGS. 7A through 7C are cross-sectional views for explaining the operation of the liquid fuel cartridge of FIG. 6.

DETAILED DESCRIPTION OF THE EMBODIMENTS

Figure 1:
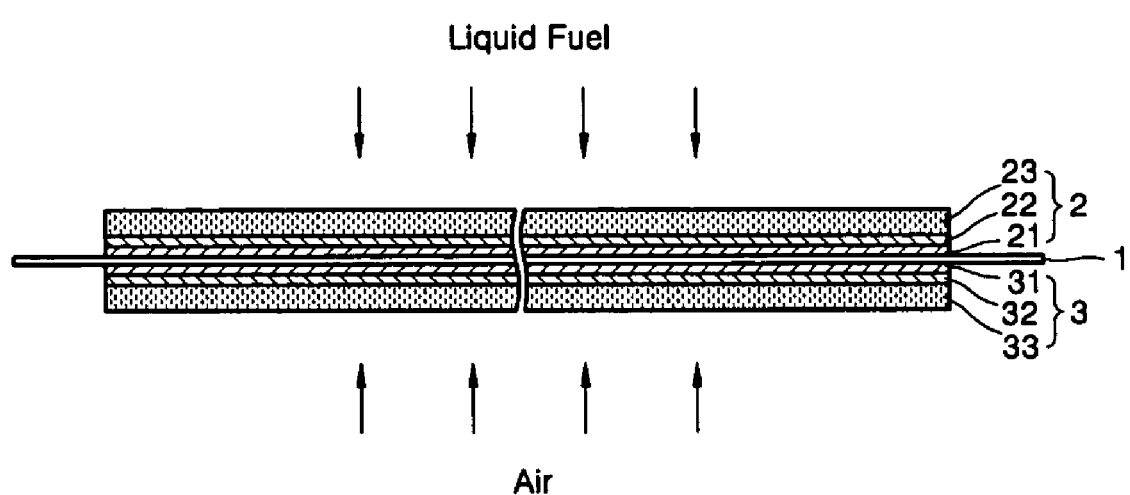
FIG. 1 is a cross-sectional view of a basic structure of a direct liquid feed fuel cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 2 is a cross-sectional view illustrating a liquid fuel cartridge 100 according to an embodiment of the present invention.

Referring to FIG. 2, the liquid fuel cartridge 100 includes a housing 110 for storing a liquid fuel. The housing 110 includes a storage unit 120 for storing the liquid fuel and may include a water recovering unit for storing water recovered from a fuel cell (not shown). The storage unit 120 may be a flexible pouch that can change its volume according to the volume of the liquid fuel contained therein. The storage unit 120 can be formed of any suitable flexible material that is inert to a liquid fuel and can be, for example, polypropylene or polyester. The water recovering unit may be a space in the housing 110. That is, water recovered from a fuel cell may be stored in a volume of the housing 110 that is not taken up by the storage unit 120. The housing 110 of the liquid fuel cartridge may be any suitable shape, such as, for example, hexahedral.

A fuel outlet 122 and a water inlet 132 extending to the outside of the housing 110 are respectively connected to the storage unit 120 and the water recovering unit. Water generated by using the liquid fuel enters into the water recovering unit from the fuel cell (not shown) through the water inlet 132.

The storage unit 120 includes a bistable structure 140. What is meant by the term "bistable" structure is that the structure will be either in a "full" state, when the bistable structure contains liquid fuel, or in an "exhausted" state when the bistable structure has run out of liquid fuel. The bistable structure does not stably remain in a transitional state between the full and the exhausted state. The bistable structure may remain in the full state while liquid fuel is being withdrawn from the storage unit and until the bistable structure becomes empty or exhausted. At that point, a variety of forces, including gravity, suction force from a fuel pump or pressure from water that enters the water recovering unit, cause the bistable structure to shift at once from the full state to the exhausted state.

The bistable structure 140 may include a pair of wall portions 142 facing each other, a roof portion 144, and a flexible portion 146 that connects the wall portion 142 to the roof portion 144. The roof portion 144 may be in one of two positions, depending on the bistable state of the bistable structure. In particular, the roof portion 144 is located at a higher or raised position when the bistable structure 140 contains liquid fuel and is changed to a lower position by a discharging pressure of the fuel outlet 122 when the liquid fuel is used up in the bistable structure 140 (see FIG. 4C). Accordingly, the bistable structure 140 may be in either of two positions or bistable states, specifically, a higher position, when the storage unit contains fuel, or a lower position, when the storage unit does not contain fuel.

The flexible portion 146 must have a stiffness strong enough to support the weight of the roof portion 144. The flexible portion 146 deforms to move the roof portion 144 to the higher position when the liquid fuel is filling the storage unit 120 and maintains the higher position as long as liquid fuel remains in the storage unit 120. After the liquid fuel in the storage unit 120 is exhausted, the flexible portion 146 deforms so that the bistable structure 140 collapses. The flexible portion may have a stiffness that is greater than the stiffness of the remainder of the storage unit, which forms a flexible pouch. When the storage unit is emptied, the flexible pouch portion, that is, all of the storage unit except for the bistable structure, collapses first and then the bistable structure collapses to its lowered position when all of the liquid fuel has been exhausted.

A marker 152, such as a color marker, may be installed on the roof portion 144. A transparent window 112 can be installed on a location of the housing 110 corresponding to the bistable structure 140 so that as the liquid fuel is consumed, the user can determine whether the liquid fuel has become exhausted by determining the location of the marker through the transparent window 112. For example, if the marker 152 is placed on a lower part of the roof portion 144, that is, a part of the roof portion that faces the interior of the storage unit 120, and if the storage unit 120 is made of a translucent or transparent material, a user can determine if the liquid fuel has become exhausted by detecting the marker 152 through the transparent window 152.

In FIG. 2, a pair of the wall portions 142 are vertically located, but the present invention is not limited thereto. For example, another pair of wall portions (not shown) facing each other can further be included to the side of the pair of wall portions 142. Other numbers of wall portions are possible. The wall portions can be connected and sealed to each other, and the wall portions and the flexible portion 146 can be connected and sealed.

FIG. 3 is a cross-sectional view illustrating a liquid fuel cartridge 200 according to another embodiment of the present invention. The same reference numerals are used for the elements substantially identical to those depicted in FIG. 2, and detailed descriptions thereof will be omitted.

A liquid fuel cartridge 200 according to the present embodiment includes a sensor unit that detects the state of the bistable structure 140.

The sensor unit may include a metal 252, such as a metal plate or piece, installed on a lower part of the roof portion 144 and a sensor 254 for detecting the metal 252. The sensor 254 can be installed on a lower part of the housing 110 at a location corresponding to the location of the bistable structure 140 or on a location in the liquid fuel cell where the liquid fuel cartridge 200 is installed.

The sensor 254 may be a proximity switch.

Also, the metal 252 may be a magnet and the sensor 254 may be a magnetic sensor.

The operation of the liquid fuel cartridge 200 having the bistable structure according to this embodiment will now be described in detail with reference to FIGS. 4A through 4C.

Referring to FIG. 4A, the liquid fuel cartridge 200 is filled to capacity with a liquid fuel. A fuel outlet 122 is connected to a fuel cell (not shown) through a fuel delivery unit (not shown). A water inlet 132 is provided to allow waste water from the fuel cell to enter into a water recovering unit. The water recovering unit is not separately indicated in FIGS. 4A-4C and can be any portion of the housing 110 that is not occupied by the storage unit 120. As the liquid fuel cell is operated, the amount of the liquid fuel in the storage unit 120 is reduced and the amount of water in the water recovering unit is increased.

Referring to FIG. 4B, as the majority of the liquid fuel in the storage unit 120 is used up, the wall portion 142 of the bistable structure 140 moves toward the sensor 254. At this time, the roof portion 144 is located at the first or higher position. In other words, the bistable structure is still in the bistable state that indicates that the liquid fuel cartridge contains fuel. The water recovering unit may be filled with water (not shown) that enters through the water inlet 132.

Referring to FIG. 4C, as the liquid fuel in the storage unit 120 is further used, the flexible portion 146 collapses and the roof portion 144 moves down to the second or lower position, which is the bistable state that indicates that the liquid fuel has been exhausted. Accordingly, the metal 252 relocates near the sensor 254. The sensor 254 detects the relocation of the metal 252 and outputs a signal to indicate that the liquid fuel is exhausted.

FIG. 5 is a cross-sectional view illustrating a liquid fuel cartridge 300 according to still another embodiment of the present invention. The same reference numerals are used for the elements substantially identical to those depicted in FIG. 2, and detailed descriptions thereof will be omitted.

Referring to FIG. 5, a first magnet 352 is installed on a lower part of the roof portion 144 of the bistable structure 140, a second magnet 356 is installed at the bottom of the housing 110 at a location corresponding to the location of the first magnet 352, and a magnetic sensor 354 is installed under the second magnet 356. The magnetic sensor 354 may be a Hall effect sensor or any other type of magnetic sensor that detects a magnetic flux having an intensity greater than a predetermined level. That is, the magnetic sensor 354 is designed to detect the magnetic flux that results when the first magnet 352 and the second magnet 356 are combined.

When the first magnet 352 reaches the position depicted in FIG. 4B, the second magnet 356 exerts a magnetic force on the first magnet 352, causing the first magnet 352 to contact the second magnet 356. In other words, the magnetic force exerted by the second magnet 356 on the first magnet 352 aids the transition of the bistable structure 140 from a first bistable position, in which the roof portion 144 is in a higher position and in which the first magnet 352 and the second magnet 356 are not in contact, to a second bistable position in which the roof portion 144 is in a lower position and in which the first magnet 352 and the second magnet 356 are in contact. Then, the magnetic sensor 354 detects the resulting increased magnetic flux, and accordingly, outputs a signal that the liquid fuel is exhausted.

Figure 6:
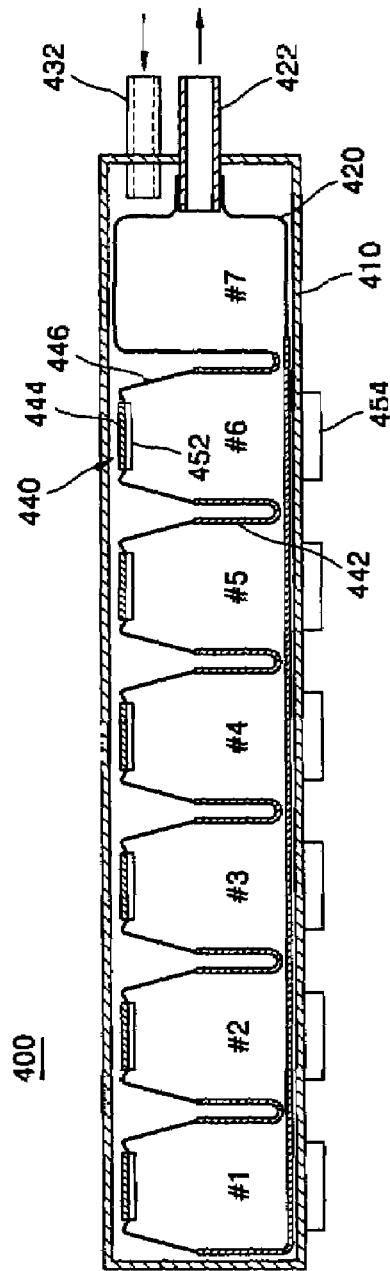
FIG. 6 is a cross-sectional view illustrating a liquid fuel cartridge according to yet another embodiment of the present invention.

FIG. 6 is a cross-sectional view illustrating a liquid fuel cartridge 400 according to yet another embodiment of the present invention.

Referring to FIG. 6, the liquid fuel cartridge 400 includes a housing 410 for storing a liquid fuel. The housing 410 includes a storage unit 420 for storing the liquid fuel and may include a water recovering unit for storing water recovered from a fuel cell (not shown). The storage unit 420 may be a flexible pouch that can change its volume according to the volume of the liquid fuel contained therein. The storage unit 420 can be formed from any suitable flexible material that is inert to liquid fuel and can be, for example polypropylene or polyester. The water recovering unit may be any portion of the housing 410 that is not occupied by the storage unit 420. The housing 410 may be in any suitable shape such as, for example, hexahedral. A fuel outlet 422 and a water inlet 432 extend to the outside of the housing 410 and are respectively connected to the storage unit 420 and the water recovering unit.

A plurality of bistable structures 440 are formed in the storage unit 420, which are shown in FIGS. 6, 7A, 7B and 7C as defining regions #1 through #6. While the bistable structures are described herein referring to the labeled features of the bistable structure of region #6, and it is to be understood that the other bistable structures also have these same features. Each of the bistable structures 440 may include a pair of wall portions 442 facing each other, a roof portion 444 having bistable states, and a flexible portion 446 that connects the wall portion 442 to the roof portion 444. The roof portion 444 is located at a higher or raised position when the bistable structure 440 contains liquid fuel and is changed to a lower position when the liquid fuel in the bistable structure 440 is used up. Accordingly, each bistable structure 440 may be in either of two positions or bistable states, specifically, a higher position, when the bistable structure contains fuel or a lower position, when the bistable structure does not contain fuel.

The bistable state of each of the bistable structures may be determined by providing one or more transparent windows in locations of the housing 410 corresponding to the location of the bistable structures 440 and by providing the roof portion 444 of each bistable structure with a marker, so that the bistable state of each bistable structure can be visually determined. Alternatively, the bistable state of each bistable structure can be determined using a metal or magnetic sensor. For example, a metal 452, such as a metal piece or metal plate may be installed on a lower part of each of the roof portions 444, and sensors 454 that detect the metal 452 may be installed on a lower part of the housing 410 at locations corresponding to each of the bistable structures 440. As the liquid fuel in the storage unit 420 is consumed, the roof portion 444 of each of the bistable structures 440 is sequentially moved to its lower position. Thus, the user can recognize the amount of fuel consumption from the number of the roof portions 444 of the bistable structures 440 that are located at the lower position. That is, the number of collapsed bistable structures 440 indicates the amount of fuel consumed. As another example, each bistable structure may have first and second magnets and a corresponding Hall effect sensor as described in the embodiment of FIG. 5. A sensor unit may provide information from the Hall effect sensors regarding the bistable state of the bistable structures 440.

The collapsing sequence of the bistable structures 440 shown in FIG. 6 may be controlled by controlling the stiffness of flexible portions 446. For example, the storage unit 420 can be divided into first through seven regions, with regions #1 through #6 being bistable structures as described herein and region #7 being a flexible pouch portion of the storage unit. In this case, if the stiffness of the flexible portions 446 of the first region through the sixth region are sequentially increased and are each greater than the stiffness of the seventh region, the liquid fuel in the seventh region will be consumed first, and then, the liquid fuel will be sequentially consumed from the first region to the sixth region. As the fuel is consumed, the first region, which is farthest from the fuel outlet, collapses first, followed by the remaining regions in order.

The operation of the liquid fuel cartridge 400 having the bistable structure 440 according to this embodiment will now be described in detail with reference to FIGS. 7A through 7C.

Figure 7A:
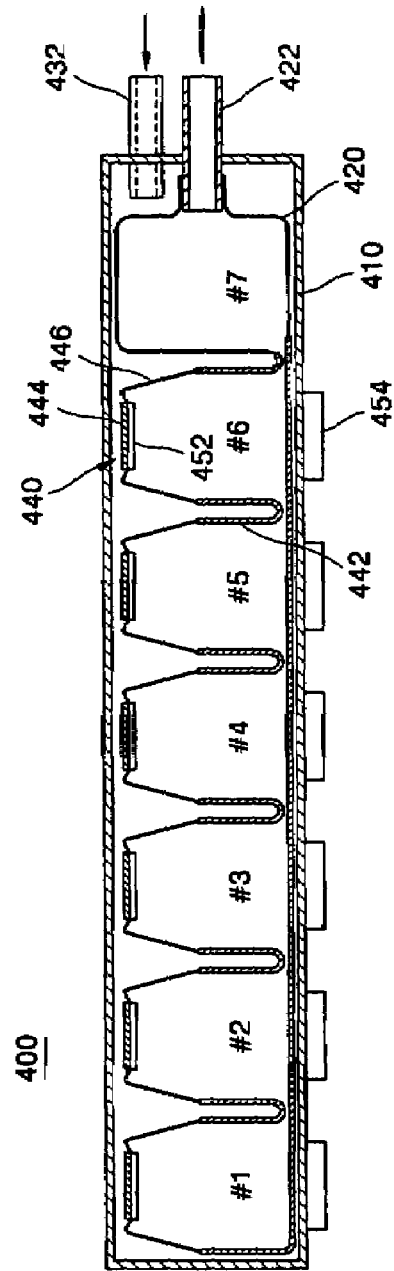

Referring to FIG. 7A, a liquid fuel cartridge 400 is filled to capacity with a liquid fuel. A fuel outlet 422 is connected to a fuel cell (not shown) through a fuel delivery unit (not shown). Waste water from the fuel cell may enter into a water recovering unit through the water inlet 432. As the liquid fuel cell is operated, the amount of the liquid fuel in the storage unit 420 is reduced and the amount of water in the water recovering unit increases. The storage unit 420 is divided into the first through seventh regions.

Referring to FIG. 7B, as the fuel cell operates, the liquid fuel in the seventh region is consumed first.

Referring to FIG. 7C, when the liquid fuel in the seventh region is exhausted, a bistable structure 440 having a flexible portion 446 with a low stiffness, i.e., the bistable structure 440 in the first region (region #1 in FIG. 7C) collapses. At this time, the roof portion 444 is moved to the lower position when the flexible portion 446 collapses. Accordingly, the metal 452 is positioned near the sensor 454, and thus, the sensor 454 detects the metal 452 and generates a signal indicating the exhaustion of the liquid fuel in the corresponding region.

Accordingly, during the operation of the fuel cell, the number of the bistable structures 440 that have collapsed in the first through seventh regions can be known, and the amount of the liquid fuel remaining in the liquid fuel cartridge 400 can be determined according to the number of collapsed bistable structures 440. In other words, the number of collapsed bistable structures 440 correlates with the amount of liquid fuel that has been exhausted, and that amount can be subtracted from the original amount of liquid fuel to determine the amount of remaining fuel. Alternatively, the number of uncollapsed bistable structures can be known and the amount of liquid fuel remaining in the storage unit can be determined directly from the number of uncollapsed bistable structures.

As described above, according to the present invention, the consumption of a liquid fuel in a liquid fuel cartridge can be easily and accurately detected through the state of the bistable structures in the liquid fuel cartridge.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A liquid fuel cartridge having bistable structures, comprising:

a housing;

a storage unit that is placed in the housing and stores a liquid fuel, the storage unit comprising a plurality of bistable structures that are connected in a row, wherein each bistable structure has bistable states corresponding to a full state and an exhausted state with respect to an amount of liquid fuel contained therein, wherein each bistable structure comprises:

at least one pair of wall portions;

a roof portion; and a flexible portion that connects the wall portions and the roof portion, wherein the flexible portion has a sufficient stiffness to support the roof portion at a raised position when the bistable structure contains liquid fuel and has a sufficient flexibility to allow the roof portion to collapse to a lowered position when the bistable structure has been emptied of fuel, and wherein the plurality of bistable structures are arranged in a sequence with respect to the fuel outlet and wherein a stiffness of the flexible portion of each bistable structure is successively increased from a bistable structure farthest from the fuel outlet to a bistable structure closest to the fuel outlet, so that when the storage unit is filled with liquid fuel, the roof portion of each of the bistable structures is in the raised position and when the storage unit is emptied of liquid fuel, the bistable structures collapse in sequence beginning with the bistable structure that is farthest from the fuel outlet;

a fuel outlet that is connected to an end of the storage unit and that extends to an outside of the housing; and one or more windows through which the bistable states of the bistable structures are detected.

2. The liquid fuel cartridge of claim 1, wherein each bistable structure comprises:

a pair of wall portions facing each other;

a roof portion that indicates the state of the bistable structure; and a flexible portion that connects the wall portions and the roof portion, wherein the roof portion is located at a raised position when the bistable structure contains liquid fuel and is located at a lowered position when the liquid fuel in the bistable structure is exhausted.

3. The liquid fuel cartridge of claim 1, wherein each bistable structure comprises:
  a first pair of wall portions facing each other;
  a second pair of wall portions facing each other and lateral to the first pair of walls;
  a roof portion that indicates the bistable states of the bistable structure; and
  a flexible portion that connects the first and second pairs of wall portions and the roof portion; and
  wherein the roof portion is located at a raised position when the bistable structure contains liquid fuel and is located at a lowered position when the liquid fuel in the bistable structure is exhausted.

4. The liquid fuel cartridge of claim 2, wherein the storage unit includes at least one pouch portion that does not form part of the plurality of bistable structures, and wherein the flexible portion of the bistable structures has a stiffness greater than a stiffness of the at least one pouch portion of the storage unit.

5. The liquid fuel cartridge of claim 2, wherein each bistable structure further comprises a marker on the roof portion that is visible through the one or more windows.

6. The liquid fuel cartridge of claim 1, further comprising:
  a water recovering unit in the housing to store water recovered from a fuel cell; and
  a water inlet extending to an outside of the housing to allow water to enter into the water recovering unit from the fuel cell.

7. The liquid fuel cartridge of claim 1, wherein as the storage unit is emptied of liquid fuel, bistable structures that have collapsed are visible through the one or more windows and wherein a number of bistable structures that have collapsed correlates with an amount of liquid fuel that has been emptied from the storage unit.

8. A liquid fuel cartridge having bistable structures, comprising:
  a housing;
  a storage unit that stores a liquid fuel in the housing, the storage unit comprising a plurality of bistable structures that are connected in a row to the storage unit, wherein each bistable structure has bistable states corresponding to a full state and an exhausted state with respect to an amount of liquid fuel contained therein,
  wherein each bistable structure comprises:
  at least one pair of wall portions;
  a roof portion; and
  a flexible portion that connects the wall portions and the roof portion,
  wherein the flexible portion has a sufficient stiffness to support the roof portion at a raised position when the bistable structure contains liquid fuel and has a sufficient flexibility to allow the roof portion to collapse to a lowered position when the bistable structure has been emptied of fuel, and
  wherein the plurality of bistable structures are arranged in a sequence with respect to the fuel outlet and wherein the stiffness of the flexible portion of each bistable structure is successively increased from a bistable structure farthest from the fuel outlet to a bistable structure closest to the fuel outlet, so that when the storage unit is filled with liquid fuel, the roof portion of each of the bistable structures is in the raised position and when the storage unit is emptied of liquid fuel, the bistable structures collapse in sequence beginning with the bistable structure that is farthest from the fuel outlet;
  a fuel outlet that is connected to an end of the storage unit and extended to an outside of the housing; and
  a sensor unit that detects the bistable state of each of the bistable structures.

9. The liquid fuel cartridge of claim 8, wherein each bistable structure comprises:
  a pair of wall portions facing each other;
  a roof portion that indicates the state of the bistable structure; and
  a flexible portion that connects the wall portions and the roof portion,
  wherein the roof portion is located at a raised position when the bistable structure contains liquid fuel and is located at a lowered position when the liquid fuel in the bistable structure is exhausted.

10. The liquid fuel cartridge of claim 8, wherein each bistable structure comprises:
  a first pair of wall portions facing each other;
  a second pair of wall portions facing each other and lateral to the first pair of walls;
  a roof portion that indicates the bistable states of the bistable structure; and
  a flexible portion that connects the first and second pairs of wall portions and the roof portion; and
  wherein the roof portion is located at a raised position when the bistable structure contains liquid fuel and is located at a lowered position when the liquid fuel in the bistable structure is exhausted.

11. The liquid fuel cartridge of claim 9, wherein the storage unit includes at least one pouch portion that does not form part of the plurality of bistable structures, and wherein the flexible portion of the bistable structures has stiffness greater than the stiffness of the at least one pouch portion of the storage unit.

12. The liquid fuel cartridge of claim 9, wherein the sensor unit comprises:
  a plurality of magnetic sensors, each installed at a location of the housing corresponding to one of the bistable structures; and
  a plurality of magnets, each installed at the roof portion of one of the bistable structures.

13. The liquid fuel cartridge of claim 10, wherein the sensor unit comprises:
  a plurality of Hall effect sensors, each corresponding to one of the bistable structures;
  a plurality of first magnets, each installed at the roof portion of one of the bistable structures; and
  a plurality of second magnets, each installed at a location of the housing corresponding to the location of one of the bistable structures, wherein, for each bistable structure, the first magnet contacts the second magnet when the bistable structure is in the lowered position, thereby producing an increased magnetic flux, and wherein the Hall effect sensor detects the increased magnetic flux.

14. The liquid fuel cartridge of claim 8, further comprising:
  a water recovering unit in the housing to store water recovered from a fuel cell; and
  a water inlet that extends to an outside of the housing to allow water to enter into the water recovering unit from the fuel cell.

15. The liquid fuel cartridge of claim 8, wherein as the storage unit is emptied of liquid fuel, bistable structures that have collapsed are detected through the sensor unit and wherein a number of bistable structures that have collapsed correlates with an amount of liquid fuel that has been emptied from the storage unit.

* * * * *